(12) United States Patent
Alfandary et al.

(10) Patent No.: US 7,721,212 B2
(45) Date of Patent: May 18, 2010

(54) CONFIGURING ENTERPRISE COMPUTING SYSTEM

(75) Inventors: Shai Alfandary, Zur Moshe (IL); Malkiel Hadari, Hod HaSharon (IL)

(73) Assignee: SAP AG, Walldorf (DE)

( * ) Notice: Subject to any disclaimer, the term of this patent is extended or adjusted under 35 U.S.C. 154(b) by 101 days.

(21) Appl. No.: 11/427,116

(22) Filed: Jun. 28, 2006

(65) Prior Publication Data
US 2008/0005548 A1 Jan. 3, 2008

(51) Int. Cl.
G06F 15/177 (2006.01)
G06F 17/00 (2006.01)
G06F 9/00 (2006.01)
G06F 9/445 (2006.01)
G06Q 10/00 (2006.01)

(52) U.S. Cl. .............................. 715/735; 700/90; 713/1; 715/709; 715/734; 715/965; 717/174; 705/28

(58) Field of Classification Search .................. 700/90; 713/1; 715/709, 734, 735, 965; 717/174; 705/28
See application file for complete search history.

(56) References Cited

U.S. PATENT DOCUMENTS

| | | | | |
|---|---|---|---|---|
| 6,396,516 | B1 * | 5/2002 | Beatty | 715/764 |
| 6,744,436 | B1 * | 6/2004 | Chirieleison et al. | 345/427 |
| 6,968,505 | B2 * | 11/2005 | Stoll et al. | 715/712 |
| 2002/0158894 | A1 * | 10/2002 | Stoll et al. | 345/705 |
| 2005/0216505 | A1 * | 9/2005 | Chorley et al. | 707/103 R |
| 2005/0222698 | A1 * | 10/2005 | Eryurek et al. | 700/90 |
| 2007/0162491 | A1 * | 7/2007 | Schmitz et al. | 707/103 R |

OTHER PUBLICATIONS

"Warehouse Management with mySAP Supply Chain Management", 2003. SAP. Retrieved from the internet: http://www.sap.com/usa/solutions/business-suite/scm/pdf/BWP_WM_LES.pdf.*
'Microsoft Home Network Guide' [online]. Microsoft, [retrieved on Jun. 27, 2006]. Retrieved from the Internet: <URL: www.microsoft.com/downloads/details.aspx?FamilyID-adbda816-db45-4aeb-962d->, 2 pages.
'What is SAP IDES and System Requirement for installations?' [online]. SAP, [retrieved on Jun. 27, 2006]. Retrieved from the Internet: <URL: www. sap-img.com/bc053.htm>, 3 pages.

* cited by examiner

*Primary Examiner*—Steven P Sax
*Assistant Examiner*—Grant D Johnson
(74) *Attorney, Agent, or Firm*—Fish & Richardson P.C.

(57) ABSTRACT

A configuration for an enterprise computing system is selected. A computer-implemented method to be performed in connection with installing a software system includes presenting, on a display device, multiple selectable visual representations regarding how to configure an enterprise computing system. Each of the visual representations has associated therewith a predefined set of configuration data for the enterprise computing system, and each visual representation depicts a feature of the associated predefined set of configuration data that differentiates from the other predefined sets of configuration data. The method includes receiving a selection of one of the visual representations by a user, and configuring the enterprise computing system using at least one of the predefined sets of configuration data that is associated with the selected visual representation.

17 Claims, 11 Drawing Sheets

FIG. 4

CONFIGURING ENTERPRISE COMPUTING SYSTEM

TECHNICAL FIELD

This document relates to selecting a configuration for installing an enterprise computing system.

BACKGROUND

Some computer systems are designed to offer a significant amount of flexibility in how they are implemented and used. This applies, for example, in the area of enterprise computing systems, including those available from SAP AG in Walldorf (Baden), Germany. Such systems are sometimes built so that they can operate in many different situations depending on the particular customer's needs. The operation of the system is dictated in large part by configuration settings that the individual customer organization applies to the system by. For example, in a warehouse management system there may be alternatives for how stock is delivered to storage locations, in a production management system there may be alternatives for how machines are used, and so on. One advantage for larger-sized customers is that the same type of system can be implemented in different areas of the customer's operations. Another is that if the customer's needs change over time, the system's flexibility can allow it to adapt to the new circumstances.

System configuration is sometimes done by consultants that are experts in the particular system and knowledgeable about the many configuration settings that should be made to get the system operational. Such a custom fitting of the system to the owner's needs can be costly and can take some time before the system begins operating. For example, the consultant may need to access several different transactions in a configuration tool and there specify the complex configuration data that, based on the intended use, applies to each aspect of the system. Another approach is to present an often quite extensive questionnaire to the user, wherein the user's answers are used in configuring the system.

SUMMARY

The invention relates to selecting a configuration for an enterprise computing system. In a first general aspect, a computer-implemented method to be performed in connection with installing a software system includes presenting, on a display device, multiple selectable visual representations regarding how to configure an enterprise computing system. Each of the visual representations has associated therewith a predefined set of configuration data for the enterprise computing system, and each visual representation depicts a feature of the associated predefined set of configuration data that differentiates from the other predefined sets of configuration data. The method includes receiving a selection of one of the visual representations by a user, and configuring the enterprise computing system using at least one of the predefined sets of configuration data that is associated with the selected visual representation.

Implementations may include any or all of the following features. Several sets of the visual representations may be presented to the user, each of the sets relating to a particular category of configuration settings for the enterprise computing system. At least some of the visual representations may relate to an extent to which storage and operation control is to be performed in premises where the enterprise computing system is to be used. At least some of the visual representations may relate to whether goods are transported to and from premises where the enterprise computing system is to be used. At least some of the visual representations may relate to a layout of premises where the enterprise computing system is to be used. At least some of the visual representations may relate to a process flow for premises where the enterprise computing system is to be used. A first one of the visual representations may include a control that a user can activate to trigger presentation of a user-selectable portion of the associated configuration data. The first visual representation may depict a unit, the enterprise computing system to govern use of the unit, and the user-selectable portion of the associated configuration data may relate to how the unit operates. The user-selectable control may visually connect at least two units with each other, and the user-selectable portion of the associated configuration data may relate to a resource that moves material between the two units. The configuration data may include at least some industry-specific portions, and the method may further include presenting an industry selection view on the display device for user selection, wherein those of the visual representations that are associated with a selected industry are to be presented on the display device. Configuring the enterprise computing system may include providing, to a configuration tool, the at least one of the predefined sets of configuration data that is associated with the selected visual representation, the configuration tool being configured for performing configuration also without presenting the multiple selectable visual representations. Each of the multiple selectable visual representations may be generated to resemble an environment in which the enterprise computing system is to be used.

In a second general aspect, a computer program product is tangibly embodied in an information carrier and includes instructions that, when executed, generate on a display device a graphical user interface to be generated in connection with installing a software system. The graphical user interface includes a presentation area presenting multiple selectable visual representations regarding how to configure an enterprise computing system. Each of the visual representations has associated therewith a predefined set of configuration data for the enterprise computing system, and each visual representation depicts a feature of the associated predefined set of configuration data that differentiates from the other predefined sets of configuration data. The graphical user interface includes a first input control for a user to select one of the visual representations, wherein after a selection is received, the enterprise computing system will be configured using one of the predefined sets of configuration data that is associated with the selected visual representation.

Implementations may include any or all of the following features. A first one of the visual representations may include a second input control that a user can activate to trigger presentation of a user-selectable portion of the associated configuration data. The first visual representation may depict a unit, the enterprise computing system to govern use of the unit, and the user-selectable portion of the associated configuration data may relate to how the unit operates. The second input control may visually connect at least two units with each other, and the user-selectable portion of the associated configuration data may relate to a resource that moves material between the two units. Several sets of the visual representations may be presented to the user, each of the sets relating to a particular category of configuration settings for the enterprise computing system. Each of the multiple selectable visual representations may be generated to resemble an environment in which the enterprise computing system is to be used.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is an exemplary screen shot of an interface for selecting characteristics of how goods are transported.

Like reference symbols in the various drawings indicate like elements.

DETAILED DESCRIPTION

Figure 1:
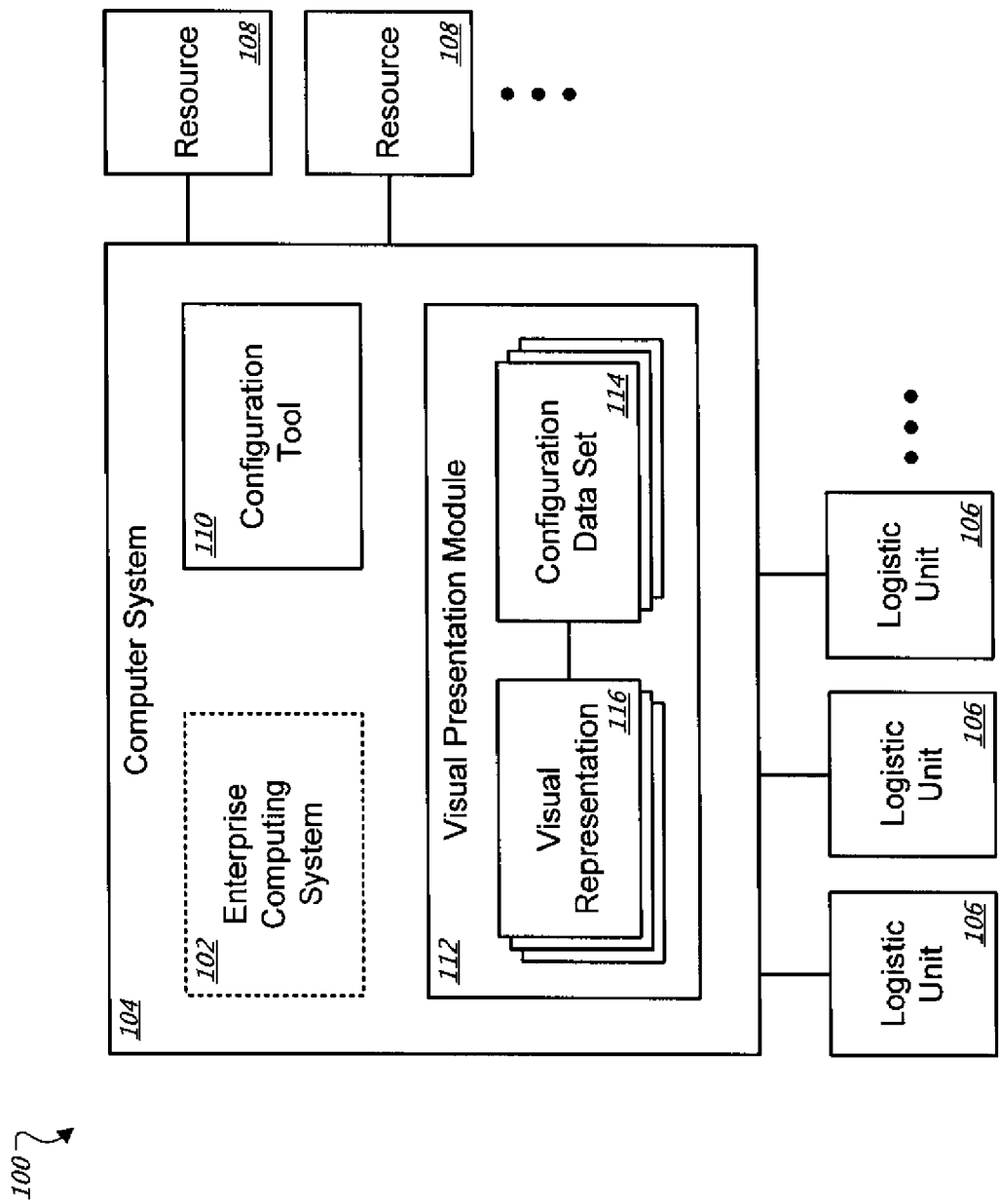
FIG. 1 is an exemplary system to be used in configuring an enterprise computing system.

FIG. 1 is an exemplary system 100 in which an enterprise computing system 102 is to be installed on a company's computer system 104. For example, the enterprise computing system 102, when running, can control production or warehouse facilities, including various logistic units 106 and resources 108. Resources 108 can include machinery (e.g., manual forklifts, robotic forklifts, conveyor belts, cranes, etc.) and human resources (e.g., workers, foremen, etc.), to name a few examples. Logistic units 106 can include work areas (e.g., shipping, receiving, production areas, etc.) and storage areas (e.g., racks, bins, shelves, aisles, etc.), to name a few examples. The computer system 104 provides that the configuration of the enterprise computing system 102 for its installation is guided by visual representations.

The computer system 104 here includes a configuration tool 110 that can be used to select configuration values for the implementation. These values can vary significantly between different industries. For example, different types of logistic units 106 and resources 108 can be used by different companies. Also, two companies that use the same type of resource may employ it in different manners and therefore may need different configuration settings. In addition, the requirements of an enterprise computing system 102 can further be affected by the company's logical layout, distribution center, production flow, workforce, and production/storage behavior. The system 100 uses visual representations to accelerate and simplify the implementation process.

A visual presentation module 112 can present the user with a user-friendly and intuitive graphical interface with which to perform the installation of an enterprise computing system 102. The visual presentation module 112 can present the user with a sequence of screens (exemplified below) which can speed up and simplify the installation process. For example, assume that the user is installing the enterprise computing system 102 at a factory that makes coffeemakers. The visual presentation module 112 can make it easy for the user to identify, for purposes of choosing the proper configuration, the coffeemaker factory's logical plant layout, the basic layout of its distribution center, the production flow of supplies and manufacturing within the plant, the employees in its workforce, and the layout of its storage/staging areas, to name a few examples. Using the user inputs, the visual presentation module 112 can provide the configuration tool 110 with the information it needs to complete the installation process. For example, the visual presentation module 112 can instruct the configuration tool 110 to use a specific set of configuration data for the enterprise computing system 102. In some implementations, this selection of configuration data is done as an initial measure to help get the system up and running without devoting too much time and effort to precisely selecting the value for each configuration setting. Once installation is complete, the parameters can later be fine-tuned or otherwise adjusted, for example.

Configuration data set 114 is a predefined set of configuration parameters for the enterprise computing system 102. This set has been generated in advance as a configuration suitable for, say, a type of customer or a certain category of organization. There are also other sets of predefined configuration data in the system, and the visual presentation module 112 will provide that at least one of the sets is chosen to be used in this particular implementation.

Here, the visual presentation module 112 includes several visual representations 116. Each one of the visual representations is 116 associated with one of the configuration data sets 114, and depicts a feature of the associated configuration data set 114 that differentiates it from the other ones of the configuration data sets 114. Accordingly, presenting some or all of the visual representations 116 can help a user in selecting one or more of the configuration data sets 114 that is appropriate for the user's needs in implementing the enterprise computing system 102. The configuration data sets 114 can be included in the configuration tool 110, so that the visual presentation module 112 manages only the visual representations 116 and the corresponding associations. For example, a pre-existing configuration tool can be improved by modifying it to receive inputs from the visual presentation module 112 that identify sets of configuration data to be used. As another example, the visual presentation module 112 can be integrated into a configuration tool when it is created so that, in a sense, it is the tool 0 that displays the visual representations.

For example, if the user selects one of the visual representations 116 that corresponds to a distribution center that both sends and receives goods, the visual presentation module 112 can automatically identify the associated configuration data set 114 containing the parameters for that type of distribution center. During the installation process, the selected configuration data set 114 can be provided to the configuration tool 110 for configuring the enterprise computing system 102. As another example, the visual presentation module 112 can identify the associated configuration data set 114 to the configuration tool 110 so that it can access the configuration data.

Figure 2:
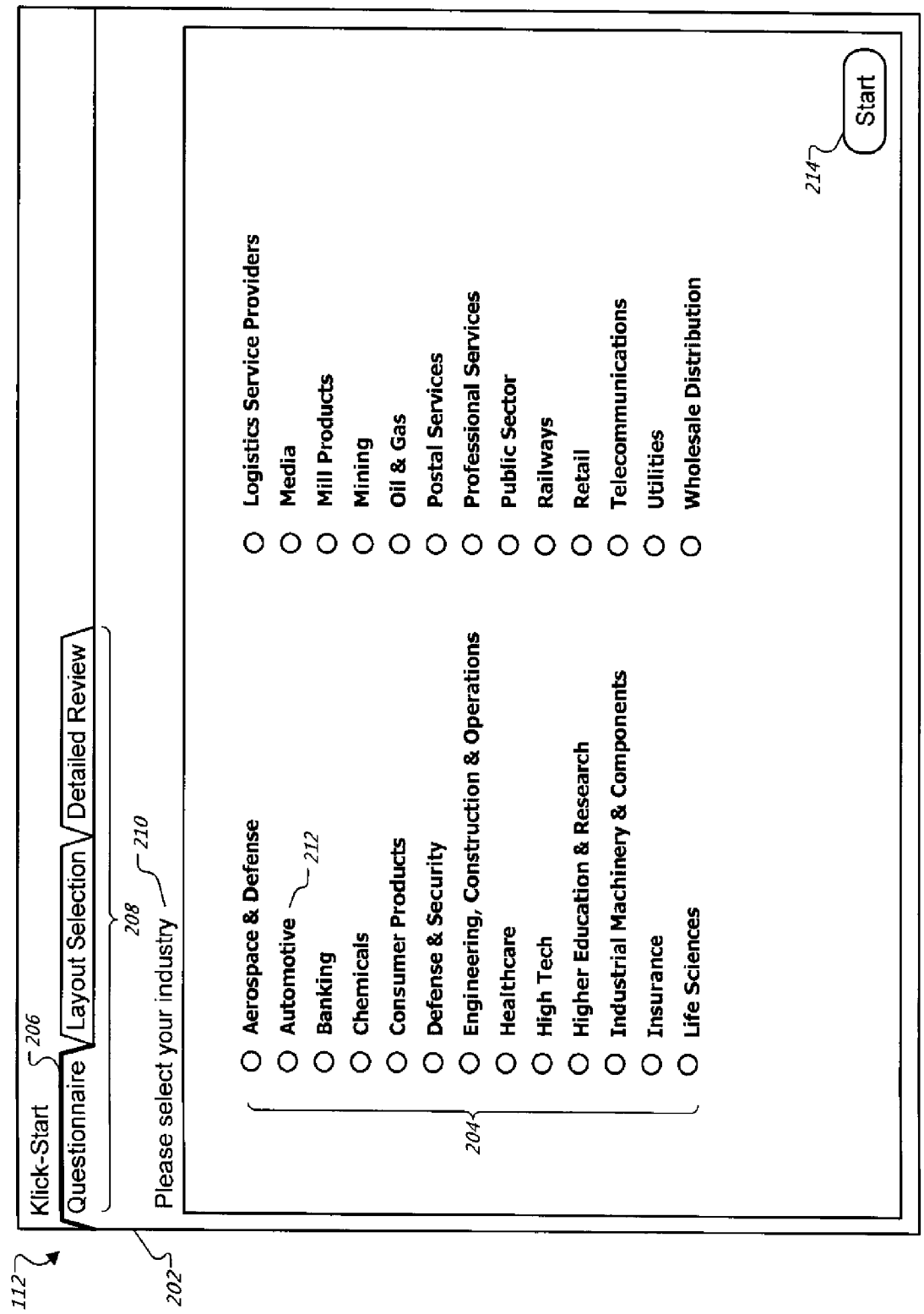
FIG. 2 is an exemplary screen shot of an interface for selecting an industry.

There will now be described examples of screen shots that include some of the visual representations 116. FIG. 2 is an exemplary screen shot 202 of an interface for selecting an industry. For example, when the enterprise computing system 102 is to be installed, a user can be presented with a list 204 of industry choices. Such a list 204 can be part of an initial questionnaire stage of the installation process, as indicated by a "Questionnaire" tab 206 being the first of various named tabs in a guided process 208. Furthermore, this screen 202 can include a text prompt 210, for example, to describe an action expected of the user.

Each of the industry choices in the list 204 is associated with one or more of the configuration data sets 114. For example, if the user picks an "Automotive" industry 212 selection, the specific portions of the corresponding configuration data set 114 relating to the "Automotive" industry are automatically identified for use in the guided process 208. By contrast, configuration data (or entire sets thereof) not relevant to the automotive industry may then be excluded from the guided process. As shown, user selection can be made by clicking a radio button, and other selection methods can be used, including clicking on the industry name. In some implementations, more than one selection can be made, and the several corresponding configuration data sets 114 are then to be used. After selecting an industry, the user can continue the installation process by clicking a start button 214 to navigate to the next screen.

Figure 3:
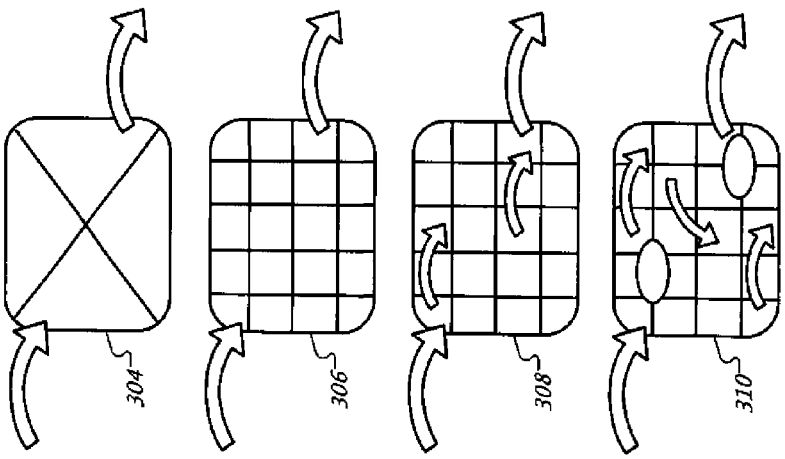
FIG. 3 is an exemplary screen shot of an interface for selecting management characteristics of the user's distribution center.

Assume here that the user has selected an industry wherein participants typically use distribution centers with at least minimal shipping and receiving procedures. Upon completion of the screen 202, the visual presentation module 112 can display the next screen of the guided process 208. FIG. 3 is an exemplary screen shot 302 of an interface for selecting, using graphical visual representations, the representative management characteristics of the user's distribution center. The visual presentation module 112 can dynamically limit or extend the visual choices displayed here based on user selections made on previous screens.

Screen 302 includes visual representations 304, 306, 306 and 310, each representing a different type of distribution center. Each of the visual representations 304-310 is associated with a corresponding one of the associated configuration data sets 114 or specific values thereof. Here, the corresponding configuration data sets 114 have different features regarding an amount of storage and operation control that is to be performed in a distribution center. The visual representations 304-310 depict the differences in these features, as will now be exemplified.

Each of the visual representations 304-310 depicts the distribution center as a rounded box with an arrow on the left representing goods incoming to the distribution center and an arrow on the right representing outgoing goods. For example, visual representation 304, with an "X" drawn in its rounded box, pictorially represents "no storage or operator control" within the distribution center, as further indicated by adjacent explanatory text 312. Visual representation 306 includes simple gridlines in the rounded box to represent a distribution center having "light storage or operation control" using bin management. Visual representation 308, having additional arrows between some of the gridlines, represents "moderate storage or operation control" with bin management and a 2-step receiving and shipping process. Finally, visual representation 310, with ellipses (e.g., to indicate internal inspecting and packing areas) and an additional internal arrow showing a 1-step or 2-step receiving and shipping process, represents "heavy storage or operation control."

During the installation process, the user can view the displayed visual representations and pick the visual representation most representative of the company's distribution center. Depicting the differentiating features of the respective choices can help the user make this selection. For example, the visual representation 308 illustrates that the corresponding configuration has a 2-step receiving and shipping process, as opposed to the visual representation 306, where there is a 1-step receiving and shipping process. When the user so does, the configuration data set 114 corresponding to that visual representation is assigned to be used in the configuration.

The visual representations 304, 306, 308 and 310 are shown in FIG. 3 as being selectable using radio buttons. The visual presentation module 112 can use other selection controls, such as the user clicking on the visual representation itself or on the adjacent explanatory text. In some implementations, default selections can already be highlighted or pre-selected (e.g., a pre-checked checkbox). Furthermore, the configuration data associated with the user's screen selection(s) can be determined when the user "completes" the screen, for example by clicking on a next button 314 to navigate to the next screen in the installation process. In this example, the user selects the visual representation 306.

Figure 4:
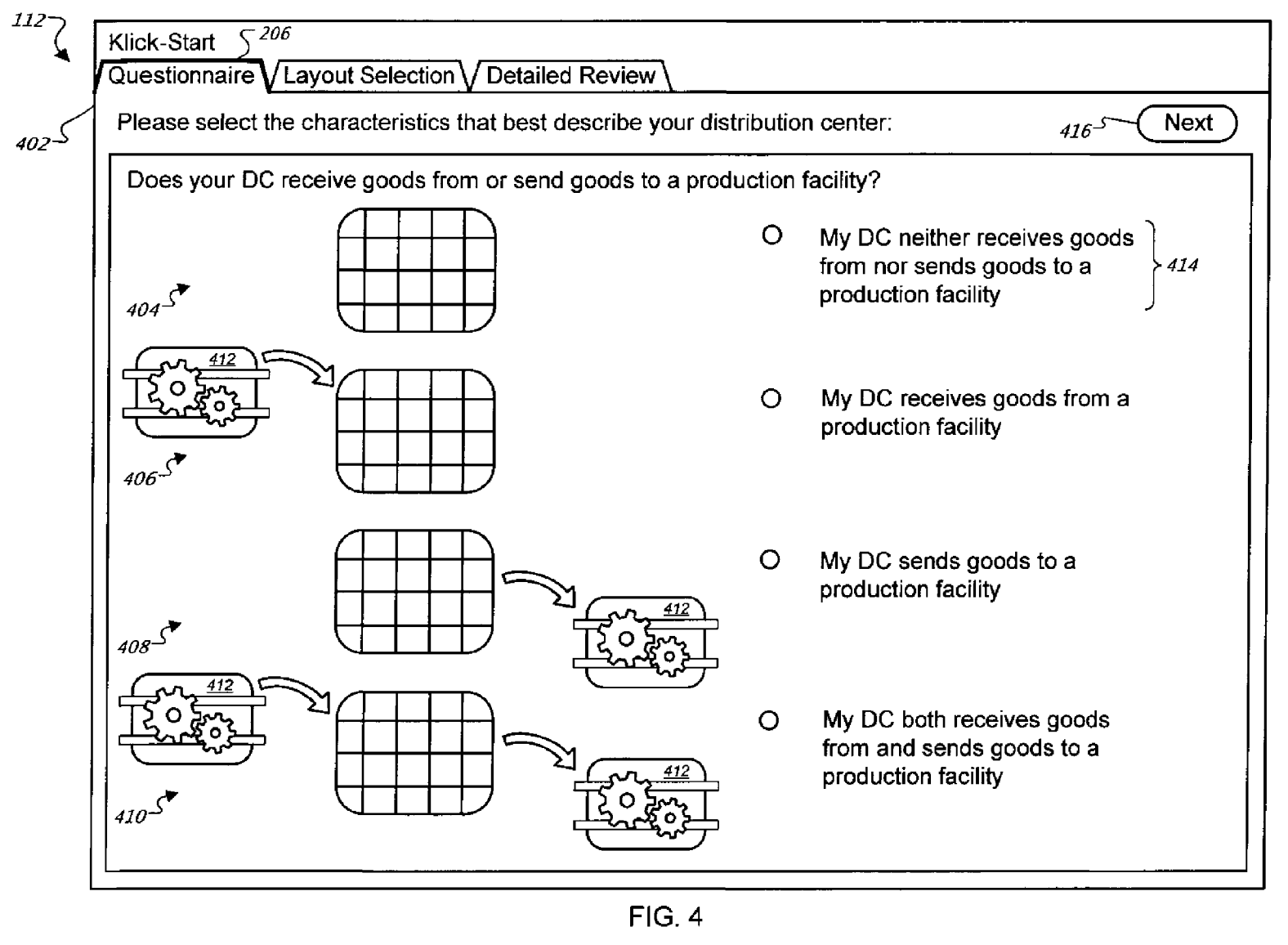

Upon completion of the screen 302, the visual presentation module 112 can display the next screen of the guided process 208. FIG. 4 is an exemplary screen shot 402 of an interface for selecting, using graphical visual representations, the representative characteristics of how goods are transported to and/or received from a production facility. The visual presentation module 112 can dynamically limit or extend the visual choices displayed here based on user selections made on previous screens.

Screen 402 includes visual representations 404, 406, 408 and 410, each representing a different scheme for receiving and/or sending goods. Each of the visual representations 404-410 is associated with a corresponding one of the associated configuration data sets 114 or specific values thereof. Each of the visual representations 404-410 here incorporates some features of the visual representation that was selected in the previous screen (in this case, the visual representation 306). Here, the corresponding configuration data sets 114 have different features regarding how goods are received from, or sent to, a production facility. The visual representations 404-410 depict the differences in these features, as will now be exemplified.

Each of the visual representations 404-410 depicts the distribution center as a rounded box containing gridlines. The visual representations 404-410 further depict goods received from, or sent to, a distribution center using a production facility visual representation 412. The visual presentation module 112 depicts the production facility visual representation 412 using a rounded box with lines representing conveyor belts and gears representing the production of goods within a production facility. Also, curved arrows, when present in any of the visual representations 404-410, represent the flow of goods between the production facility and the distribution center. For example, visual representation 404, having no production facility visual representations 412 or curved arrows depicted, pictorially represents a distribution center that "neither receives goods from nor sends goods to" a production facility, as further indicated by adjacent explanatory text 414. Visual representation 406 pictorially represents a distribution center that "receives goods from a production facility," depicted using the production facility visual representation 412 with a curved arrow coming from it into the distribution center. Visual representation 408, having a curved arrow from the distribution center to the production facility visual representation 412, represents a distribution center that "sends goods to a production facility." Finally, visual representation 410, having production facility visual representations 412 on both sides, and being connected to each using curved arrows, represents a distribution center that "both receives goods from and sends goods to a production facility."

During the installation process, the user can view the displayed visual representations and pick the visual representation most representative of the company's distribution center. Depicting the differentiating features of the respective choices can help the user make this selection. For example, the different types of distribution centers illustrated can help the user select the configuration that best matches the user's needs. When the user so does, the configuration data set 114 corresponding to that visual representation is assigned to be used in the configuration. In some implementations, there can exist additional visual representations beyond those shown in visual representations 404-410, such as those having multiple production facilities sending goods to or receiving goods from the distribution center. These additional visual representations can be accessible to the user using a control (not shown) for displaying additional layouts.

The guided process 208 can include additional controls for returning to previous screens in order for the user to change user inputs provided earlier on those screens. For example, in addition to the "next" button 416, used to complete the current screen 402 and proceed to the next screen, a "back" button (not shown) can return the user to the previous screen, in this case screen 302. This type of backward navigation can be used throughout the guided process 208.

Figure 5:
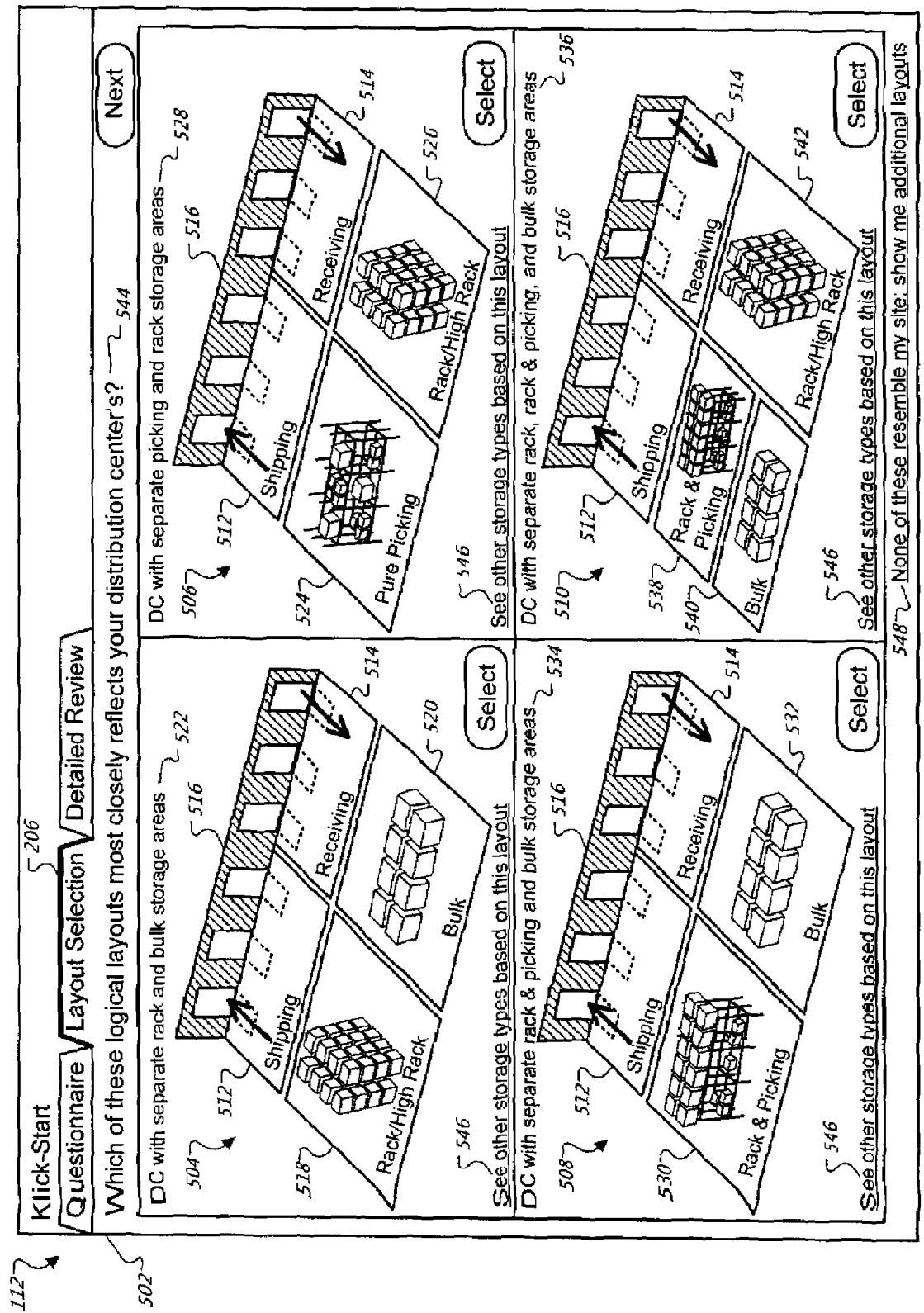
FIG. 5 is an exemplary screen shot of an interface for selecting characteristics of a logical layout.

Upon completion of the screen 402, the visual presentation module 112 can display the next screen of the guided process 208, which has now progressed to the "Layout Selection" tab. FIG. 5 is an exemplary screen shot 502 of an interface for selecting, using graphical visual representations, the representative characteristics of the logical layout of a distribution center for which the enterprise computing system 102 is being configured. The visual presentation module 112 can dynamically limit or extend the visual choices displayed here based on user selections made on previous screens.

Screen 502 includes visual representations 504, 506, 508 and 510, each representing a different logical layout of a distribution center. Each of the visual representations 504-510 is associated with a corresponding one of the associated configuration data sets 114 or specific values thereof. Here, the corresponding configuration data sets 114 have different features regarding various storage types and their logical layout within a distribution center. The visual representations 504-510 depict the differences in these features, as will now be exemplified.

Each of the visual representations 504-510 depicts a different logical layout of a distribution center. Each layout displayed here includes a shipping area visual representation 512 and a receiving area visual representation 514 in addition to different storage types, or areas, within the distribution center. A common shipping/receiving bay visual representation 516, depicted here using a row of garage doors, is shown as serving both the shipping area visual representation 512 and the receiving area visual representation 514. For example, shipping/receiving bay visual representation 516 can be a group of garage bays at the end of a factory, windows at a ticket office, or piers at a port facility, to name a few examples. Also, arrows are drawn through doors of the shipping/receiving bay visual representation 516 to indicate the flow of goods from the shipping area visual representation 512 and/or into the receiving area visual representation 514. Each of the visual representations 504-510 makes use of these common visual representations 512-516 while depicting different kinds and arrangements of storage types within the distribution center.

Each of the visual representations 504-510 includes the common visual representations described above, as well as visual representations that differentiate each visual representation. For example, visual representation 504 pictorially represents a logical layout having a "Rack/High Rack" storage type 518 and a "Bulk" storage type 520, as further indicated by adjacent explanatory text 522. The "Rack/High Rack" storage type 518 is depicted using tall stacks of boxes that can be, for example, a simple stack of boxes or boxes arranged on pallets transportable using manual or automatic forklifts. The "Bulk" storage type 520 is depicted as having multiple boxes arranged on a flat surface which can represent boxes, bins or other storage containers that can be serviceable by a stockroom clerk, for example.

Visual representation 506 pictorially represents a logical layout having a "Pure Picking" storage type 524 and a "Rack/High Rack" storage type 526, as further indicated by adjacent explanatory text 528. The "Pure Picking" storage type 524 is depicted using a tall storage shelf containing numerous boxes of various sizes that can be serviceable, for example, by a stockroom clerk, possibly with the aid of loading and/or reaching tools such as ladders, manual forklifts, etc. The "Rack/High Rack" storage type 526 included here in logical layout 506 uses a visual representation similar to that used for the "Rack/High Rack" storage type 518 included in logical layout 504, but the storage type included here is shown in a different location and in combination with a different set of storage types.

Visual representation 508 pictorially represents a logical layout having a "Rack & Picking" storage type 530 and a "Bulk" storage type 532, as further indicated by adjacent explanatory text 534. The "Rack & Picking" storage type 530 is depicted using a tall storage shelf that has characteristics of both the "Rack/High Rack" storage type 518 and the "Pure Picking" storage type 524 used in the other logical layouts. Here, the upper shelf of the "Rack & Picking" storage type 530 is depicted as holding stacks of boxes and/or pallets that can be moved, for example, using manual or automatic forklifts. The lower shelve(s) of the "Rack & Picking" storage type 530 can contain numerous boxes of various sizes that can be, for example, serviceable by a stockroom clerk, possibly using ladders, manual forklifts, etc. The "Bulk" storage type 532 included here in logical layout 508 uses a visual representation similar to that used for the "Bulk" storage type 520 included in logical layout 504, but the storage type included here is shown in a different location and in combination with a different set of storage types. In similar way, throughout the guided process 208, the visual presentation module 112 can use other specialized visual representations to exploit differences and similarities among visual representations.

Finally, visual representation 510 pictorially represents a logical layout having three storage types, as further indicated by adjacent explanatory text 536: a "Rack & Picking" storage type 538, a "Bulk" storage type 540, and a "Rack/High Rack" storage type 542. These storage types 538-542 are similar to ones used in logical layouts discussed earlier. Also, the storage types described here are just a few examples of the storage types that can be used by the visual presentation module 112.

During the installation process, the user can view the displayed visual representations and pick the visual representation most representative of the company's logical layout, as prompted to do so by user message 544. For example, the different types of storage facilities illustrated can help the user select the configuration that best matches the user's needs. Depicting the differentiating features of the respective choices can help the user make this selection. When the user so does, the configuration data set 114 corresponding to that visual representation is assigned to be used in the configuration. If none of the visual representations 504-510 currently displayed is perceived by the user to be representative logical layout, the user can use options provided by the visual presentation module 112 to display additional logical layouts. For example, to view additional logical layouts similar to that shown in visual representation 504, the user can select a control 546, such as one labeled "See other storage types based on this layout", to display other related logical layouts. In one implementation, they are presented in a similar screen. In another example, the user can use a "None of these resemble my site; show me additional layouts" control 548 to display additional layouts. Here, the user selects the visual representation 506.

Figure 6:
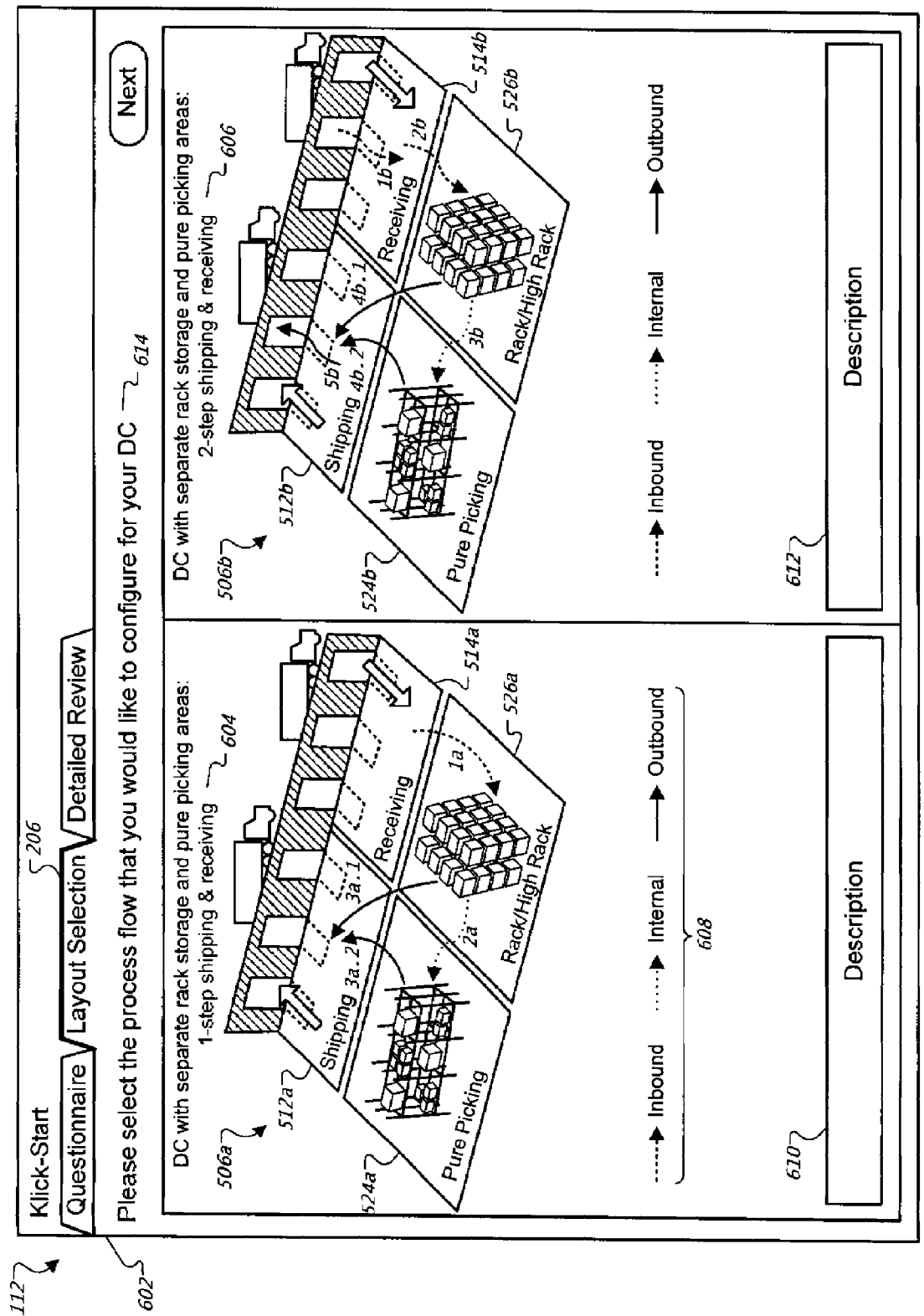
FIG. 6 is an exemplary screen shot of an interface for selecting a process flow.

Upon completion of the screen 502, the visual presentation module 112 can display the next screen of the guided process 208. FIG. 6 is an exemplary screen shot 602 of an interface for selecting, using graphical visual representations, the representative process flow within a user-selected logical layout 506 of the distribution center for which the enterprise computing system 102 is being configured. For example, the choices displayed here by the visual presentation module 112 correspond to process flows that can exist for the logical layout 506 that the user selected in screen 502. The visual presentation module 112 can dynamically limit or extend the visual choices displayed here based on user selections made on previous screens.

Screen 602 includes visual representations 506a and 506b, each representing a different process flow for the user-selected logical layout 506. Each of the visual representations 506a and 506b is associated with a corresponding one of the associated configuration data sets 114 or specific values thereof. Here, the corresponding configuration data sets 114 have different features regarding process flows between storage types within a distribution center. The visual representations 506a and 506b depict the differences in these features, as will now be exemplified.

Both visual representations 506a and 506b depict a distribution center having "Rack/High Rack" areas (areas 526a and 526b, respectively) as well as "Pure Picking" areas (areas 524a and 524b, respectively). However, they differ in the number of steps within the process flow for shipping and receiving, as further indicated by adjacent explanatory text 604 and 606. These specific differences are now described.

Visual representation 506a depicts a 1-step shipping and receiving process, using numbered arrows between the various storage types within the layout to represent sequential steps within the process. The visual presentation module 112 can further use different line styles to differentiate among various categories of process flows, as indicated by line style key 608. Here, the visual presentation module 112 uses dashed lines for inbound process flows, dotted lines for internal process flows, and solid lines for outbound process flows. For example, arrow 1a, connecting a "Receiving" area 514a to the "Rack/High Rack" area 526a, is a dashed line, representing an inbound process flow. Arrow 2a is a dotted line, representing an internal process, connecting the "Rack/High Rack" area 526a to the "Pure Picking" area 524a. Arrows 3a.1 and 3a.2 are solid lines, representing outbound process flows to a shipping area 512a, from the "Pure Picking" area 524a and the "Rack/High Rack" area 526a, respectively Here, the arrow numbering pattern uses the same prefix "3a" with different suffixes, which can indicate similar or parallel process steps that can be performed simultaneously. Thus, process steps 3a.1 and 3a.2 may be performable in parallel.

To further aid the user, the visual presentation module 112 can provide corresponding text-based information, as will now be exemplified.

The visual presentation module 112 can include a description 610 adjacent to the visual representation 506a that contains a textual description of process flow arrows used in this example. For example, the description 610 can include a description for arrow 1a that includes, for example, "Clean up goods from staging area (receiving) to rack/high rack storage." Similarly, arrow 2a can have a description such as: "Replenish goods from rack/high rack storage to pure picking." Arrow 3a.1 can be described as: "Move goods from rack/high rack storage to staging area (shipping)." Finally, arrow 3a.2 can be characterized as: "Move goods from pure picking to staging area (shipping)." The information provided here for visual representation 506a can help the user select its configuration over other configurations, one of which will now be exemplified.

Visual representation 506b depicts a 2-step shipping and receiving process, in contrast to the 1-step shipping and receiving process depicted by visual representation 506a. A 2-step shipping and receiving process may be needed, for example, if the site's shippers comprise a variety of transportation types (e.g., truck, rail, barge, ship, bicycle, etc.) or if goods need to be stored for some period of time. The visual representation 506b contains the following storage facilities: "Receiving" area 514b, "Shipping" area 512b, "Rack/High Rack" area 526b, and "Pure Picking" area 524b. These facilities may be equivalent to the corresponding ones in visual representation 506a, whereas one or more aspects of the process flows will be different. Similar to the visual representation 506a, arrows here represent the 2-step shipping and receiving process flow of visual representation 506b. For example, the 2-step process flow starts with arrow 1b, depicting a flow of goods received, for example from a supplier delivering goods by truck, into the "Receiving" area 514b, where they remain until the next step in the process flow. Arrow 2b represents the process of moving the supplies from the "Receiving" area 514b to the "Rack/High Rack" area 526b. Thus, arrows 1b and 2b here in visual representation 506b represent a 2-step process, contrasting with the 1-step process depicted in visual representation 506a. Arrow 3b represents the process flow of moving goods from the "Rack/High Rack" area 526b to the "Pure Picking" area 524b. Arrows 4b.1 and 4b.2 each represent the first step in a 2-step shipping process of moving goods to the "Shipping" area 512b from the "Rack/High Rack" area 526b and the "Pure Picking" area 524b, respectively. Arrow 5b represents the movement of goods from the "Shipping" area 512b to a shipper (e.g., a truck accepting goods through a garage door). This 2-step shipping process, depicted by the combination of arrow 5 with either or both of arrows 4b.1 and 4b.2, contrasts with the 1-step shipping process depicted in visual representation 506a.

The visual presentation module 112 can include a description 612 adjacent to the visual representation 506b that contains a textual description of process flow arrows used in this example. For example, the description 612 can include a description for arrow 1b that includes, for example, "Unload goods to staging area (receiving)." Similarly, arrow 2b can have a description such as: "Cleanup goods from staging area (receiving) to rack/high rack storage." Arrow 3b can be described as: "Replenish goods from rack/high rack storage to pure picking." Arrow 4b.1 can be described as: "Move goods from rack/high rack storage to shipping." Arrow 4b.2 can be described as: "Move goods from pure picking to shipping." Finally, arrow 5b can be characterized as: "Load goods from staging area (shipping)." The information provided here for visual representation 506b can help the user select its configuration over others, as will now be exemplified.

During the installation process, the user can view the displayed visual representations and pick the visual representation most representative of the company's process flow, as prompted to do so by user message 614. For example, the different types of process flows illustrated can help the user select the configuration that best matches the user's needs. Depicting the differentiating features of the respective choices can help the user make this selection. When the user so does, the configuration data set 114 corresponding to that visual representation is assigned to be used in the configuration. If none of the visual representations 506a-506b currently displayed is perceived by the user to be representative process flow, the user can use options provided by the visual presentation module 112 to display additional logical layouts. For example, to view additional process flows, the user can select a control (not shown), for example, labeled "None of these resemble my site; show me additional process flows." Here, the user selects the visual representation 506b.

Figure 7:
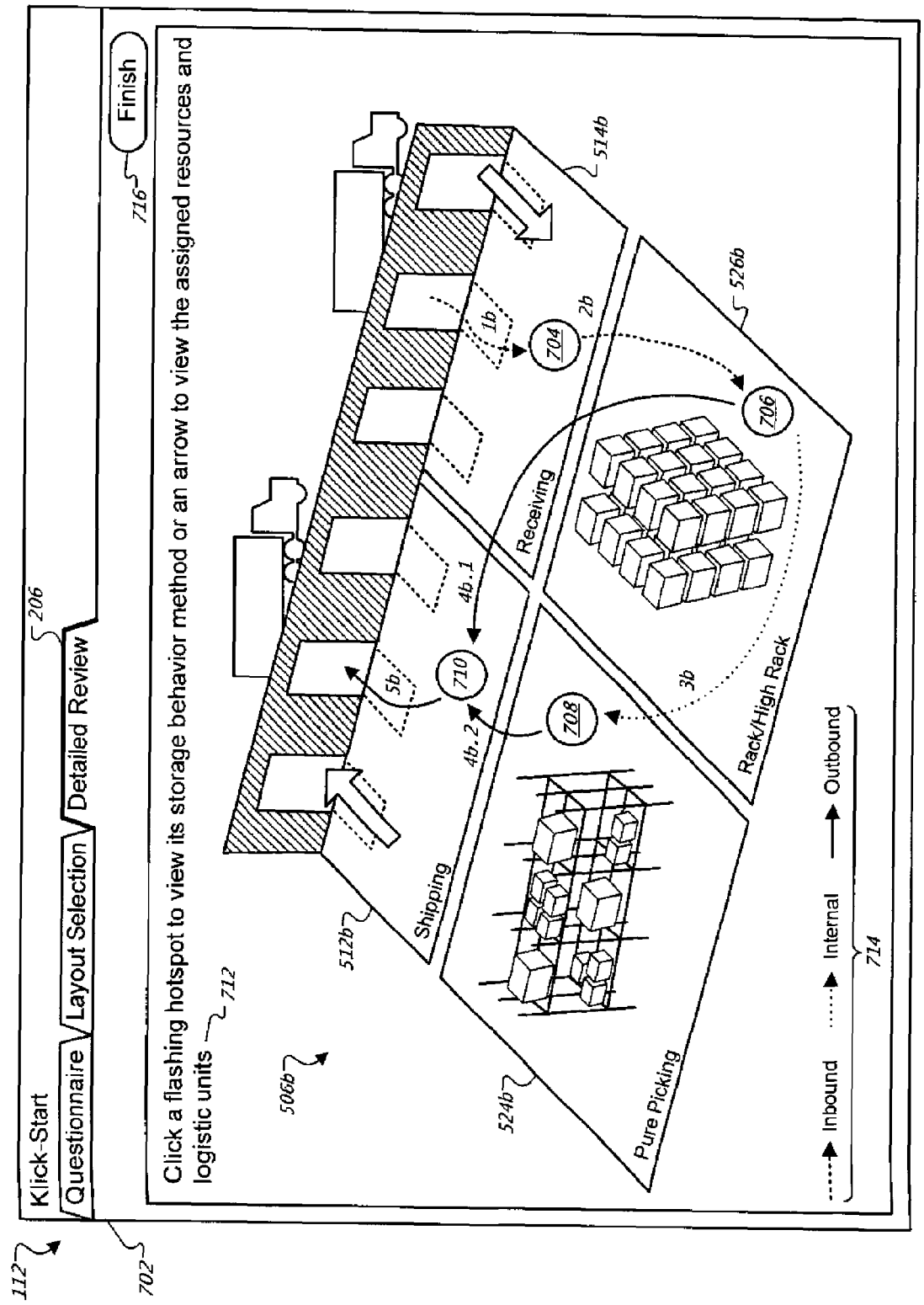
FIG. 7 is an exemplary screen shot of an interface for viewing and defining resources and logistic units.

Upon completion of the screen 602, the visual presentation module 112 can display the next screen of the guided process 208, which has now progressed to the "Detailed Review" tab. FIG. 7 is an exemplary screen shot 702 of an interface for viewing and defining, using graphical visual representations, the representative hot spots, resources and logistic units within a user-selected logical layout 506b and process flow of the distribution center for which the enterprise computing system 102 is being configured. The visual presentation module 112 can dynamically limit or extend the visual choices displayed here based on user selections made on previous screens.

Screen 702 includes "hotspot" visual representations 704, 706, 708 and 710, each representing a storage behavior method for the storage areas of the user-selected process flow 506b. Each of the "hotspot" visual representations 704-710 is depicted as a circle located within a storage area and adjacent to the endpoints of the arrows representing the process flow. As above, the visual presentation module 112 uses dashed lines for inbound process flows, dotted lines for internal process flows, and solid lines for outbound process flows, as indicated by line style key 714. Each of the "hotspot" visual representations 704-710 is further associated with a corresponding one of the associated configuration data sets 114 or specific values thereof. Here, the corresponding configuration data sets 114 have different features regarding the storage behavior methods. The visual representations 704-710 can depict the differences in these features, as will now be exemplified.

Screen 702 allows the user to view the storage behavior method associated with a hotspot and to view the resources and logistic units assigned to a process flow, as prompted to do so by user message 712. For example, the user can select (e.g., via a mouse click) hotspot 704 to view the storage behavior for goods received via arrow 1b (e.g., by a semi truck delivering supplies) and stored in the "Receiving" area 514b. In another example, the user can select arrow 2b to view the resources and logistic units assigned to the flow of goods from the "Receiving" area 514b to the "Rack/High Rack" area 526b. Upon the user selecting either a hotspot or an arrow, a corresponding popup appears, as will now be exemplified.

Figure 8:
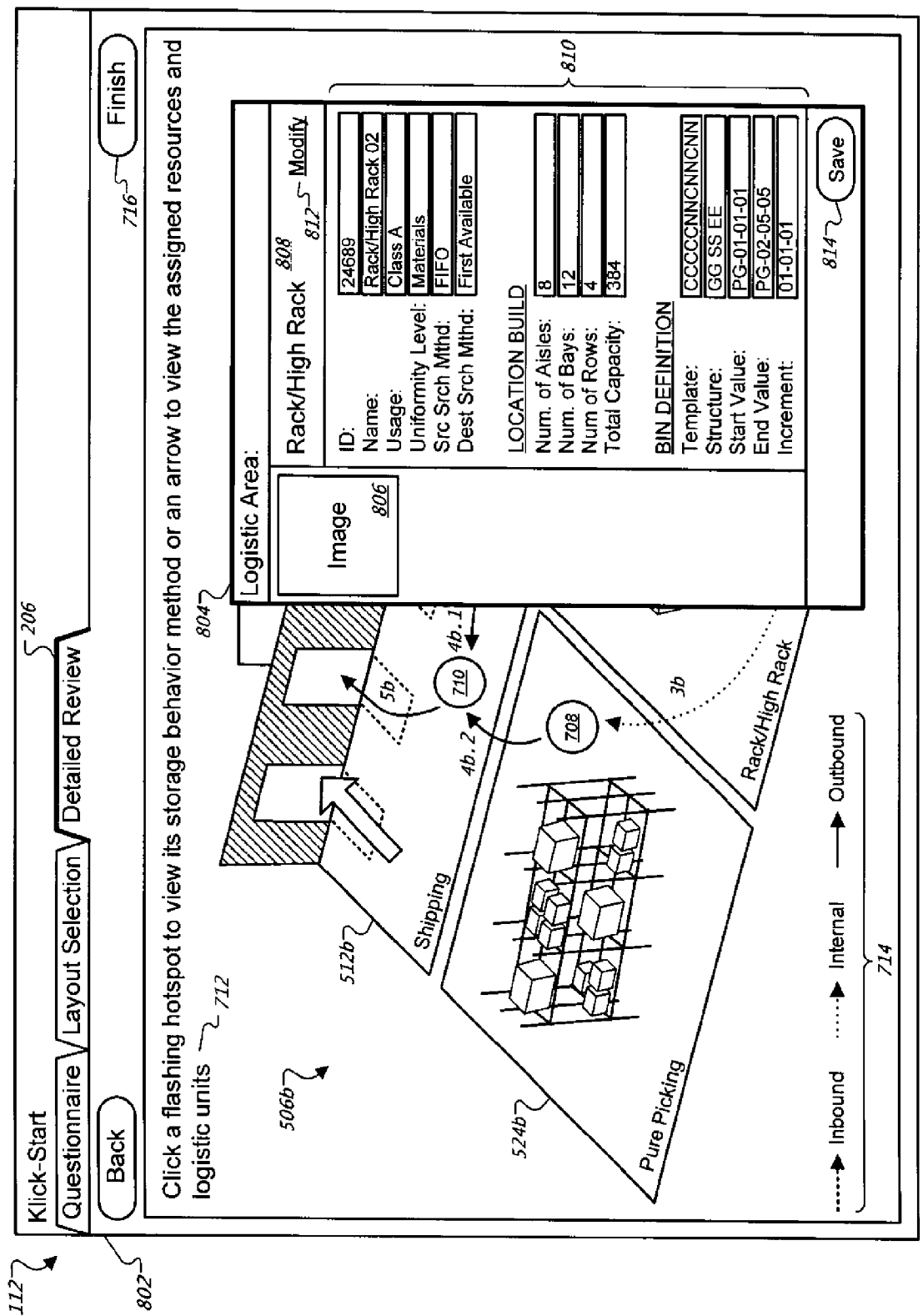
FIG. 8 is an exemplary screen shot containing a logistic area popup.

Upon user selection of a hotspot on the screen 702, the visual presentation module 112 can display detailed information for the selected hotspot. Here, the user selects the hotspot 706. FIG. 8 is an exemplary screen shot 802 containing a logistic area popup 804 for the selected logistic area. The screen shot 802 here includes the same contents as screen shot 702, with the addition of the popup 804. The visual presentation module 112 can dynamically limit or extend the visual choices displayed here based on user selections made on previous screens.

The logistic area popup 804 includes an image 806 that depicts the storage facility that was selected by the user to invoke the popup. For example, when the user selects the hotspot 706 located in "Rack/High Rack" area 526b, the image 806 included in the logistic area popup 804 graphically depicts the "Rack/High Rack" storage facility. This graphical depiction can be identical to that shown for the "Rack/High Rack" area 526b, or it can be a different view, or otherwise be enhanced in some way. A header 808, contained within the popup 804, identifies the name of the storage facility (e.g., Rack/High Rack"). The popup 804 further contains detailed information 810, consisting of several field names and values related to the storage facility. In this case, the detailed information 810 is specific to the storage facility (e.g., "Rack/High Rack") corresponding to the user's selection of hotspot 706 on screen 702. The detailed information 810 can identify the storage facility's ID (e.g., "24689"), its name (e.g., "Rack/High Rack 02"), and other information pertinent to the site's storage facilities. The detailed information 810 can further identify physical characteristics of the storage facility, such as the number of aisles (e.g., 8), the number of bays (e.g., 12), the number of rows (e.g., 4) and the total capacity of the storage facility (e.g., 384 pallets). The detailed information 810 can yet further identify bin numbering and identification protocols, such as that which can be used by the enterprise computing system 102 to control inventory or track goods and materials at the site.

During the installation process, the user can initially view the information contained in the popup 804. In addition, the user can elect to modify selected updatable fields by first selecting a control, such as the modify button 812. By selecting the modify button 812, the user can, for example, change the values of fields that are modifiable during the guided process 208 for installing the enterprise computing system 102. For example, the user can change the total capacity of the storage facility if it is known that the existing value is incorrect. In another example, the user can modify numeric values to reflect changes in the numbers of aisles, bays of rows resulting from a remodeling of a warehouse, for example. Changing these parameters can affect the values from the configuration data set 114, corresponding to the visual representation, that are ultimately assigned to be used in the configuration. When the user is done viewing and/or modifying the values for the storage facility, the user can select a control, such as a "Save" button 814, to return to the screen 702. If the user is satisfied with the selections and inputs made during the guided process 208, the user can select a control, such as a "Finish" button 716. At this time, the visual presentation module 112 can provide the configuration tool 110 with the remaining information it needs to complete the installation process.

Figure 9:
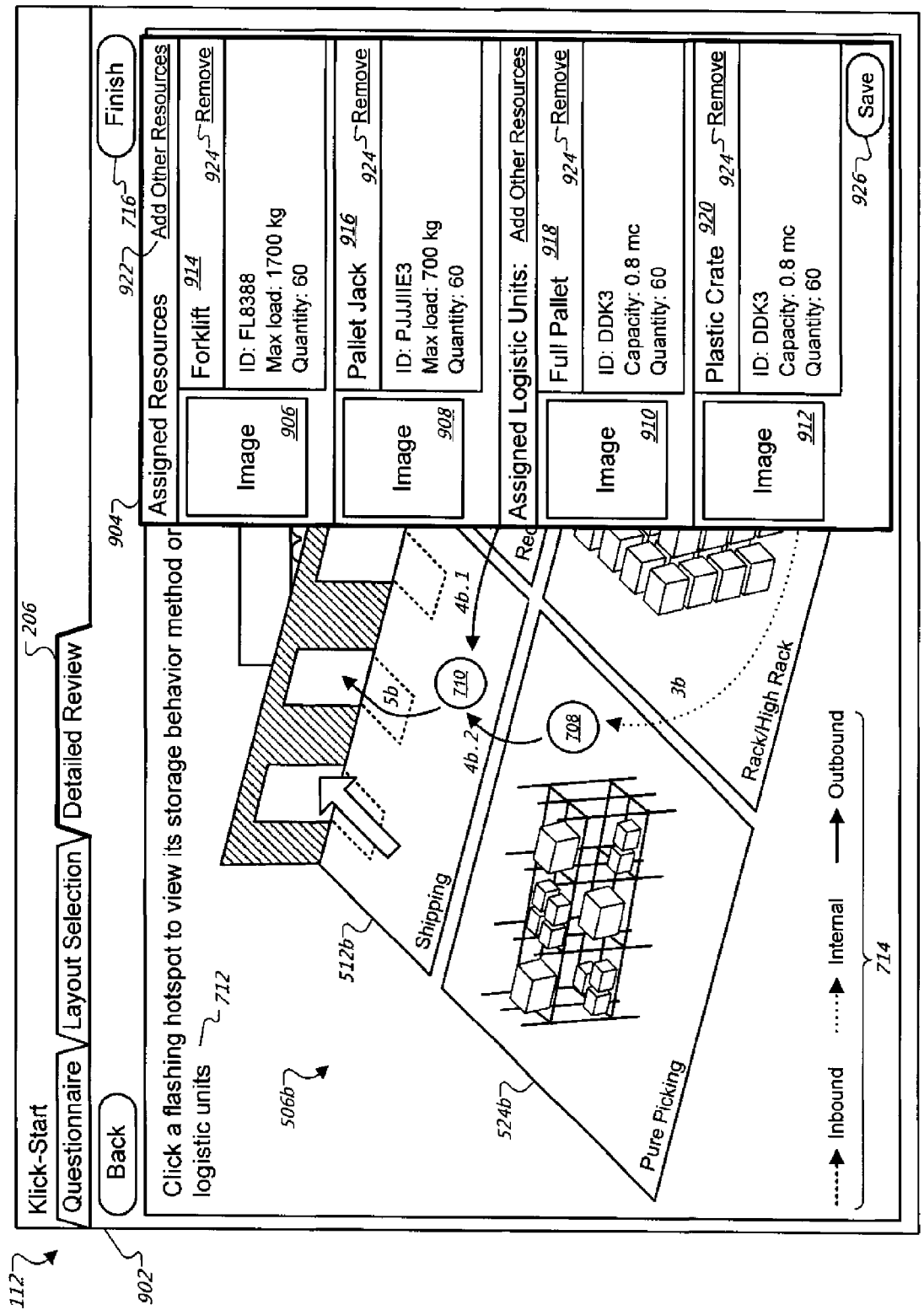
FIG. 9 is an exemplary screen shot containing an assigned resources popup.

With reference again to FIG. 7, the user can select any or all of the process flow arrows on the screen 702 to view the assigned resources and logistic units. Upon user selection of a process flow arrow on the screen 702, the visual presentation module 112 can display detailed information for the assigned resources associated with the selected process flow arrow. Here, the user selects the arrow 3b. FIG. 9 is an exemplary screen shot 902 containing an assigned resources popup 904. The screen shot 902 here includes the same contents as screen shot 702, with the addition of the popup 904. The visual presentation module 112 can dynamically limit or extend the visual choices displayed here based on user selections made on previous screens.

The assigned resources popup 904 includes images 906, 908, 910 and 912 that depict the resources that are currently assigned to move goods between storage facilities, as represented by the numbered process arrow that the user selected on screen 702. For example, when the user selects arrow 3b connecting the "Rack/High Rack" area 526b to the "Pure Picking" area 524b, the popup 904 can display images 906-912, each depicting a specific resource assigned to the process. These images 906-912 correspond to the adjacent data areas 914, 916, 918 and 920. For example, data areas 914-920 can further identify the images 906-912 with titles, such as "Forklift," "Pallet Jack," "Full Pallet" and "Plastic Crate," respectively. The data areas 914-920 can further display additional data fields below the titles, such as IDs, capacities and quantities of the resources, to name a few examples.

During the installation process, the user can initially view the information contained in the popup 904. In addition, the user can elect to change the assigned resources in various ways. For example, the user can add a resource to the current group of assigned resources by first selecting a control, such as an "Add Other Resources" button 922. The user can then select the desired resource from a list or other control (not shown). In another example, the user can remove a resource from the current group of assigned resources by selecting a control, such as a "Remove" button 924 that can be available in each of the data areas 914-920. Changing the list of assigned resources can affect the values from the configuration data set 114, corresponding to the visual representation, which values are ultimately assigned to be used in the configuration. When the user is done viewing and/or modifying the assigned resources, the user can select a control, such as a "Save" button 926, to return to the screen 702. If the user is satisfied with the selections and inputs made during the guided process 208, the user can select a control, such as the "Finish" button 716. At this time, the visual presentation module 112 can provide the configuration tool 110 with the remaining information it needs to complete the installation process.

Figure 10:
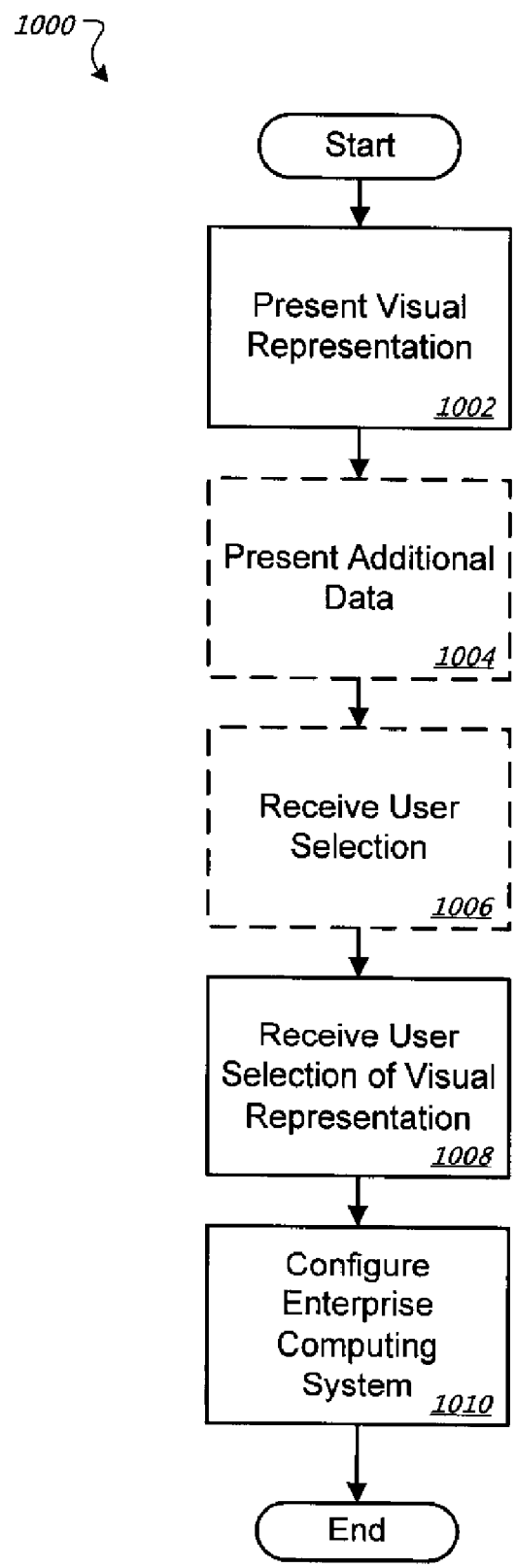
FIG. 10 is a flow chart of exemplary operations that can be performed in connection with installing a software system.

FIG. 10 is a flow chart of exemplary operations 1000 that can be performed in connection with installing a software system. The operations 1000 can be performed by a processor executing instructions stored in a computer program product. The operations 1000 begin in step 1002 with presenting, on a display device, multiple selectable visual representations regarding how to configure an enterprise computing system. The visual representations 116 can depict various selectable choices for industries, distribution centers, shipping/receiving characteristics, logical layouts, storage facilities and process flows, to name a few examples. The visual presentation module 112 can present these choices to the user during the installation of the enterprise computing system 102, for example. Such choices can be displayed as visual representations 116 during the guided process 208, using screens 202-902, for example. Each of the visual representations has an associated predefined set of configuration data for the enterprise computing system and depicts a feature of the associated predefined set of configuration data that differentiates from the other predefined sets of configuration data. For example, each of the visual representations 304-310, depicting a different level of storage and operation control within a distribution center, has an associated predefined configuration data set 114.

In optional step 1004, the installation process presents additional data to the user. For example, the user can use the additional data to base further selections. In a specific example, if the user currently has screen 702 displayed, the user can elect to display additional information. In particular, the user can select one of the hotspots 704-710 to display its storage behavior method. As another example, the user can select an arrow 1b-5b to view the assigned resources and logistic units for the process flow corresponding to that arrow. Upon selection of a hotspot or an arrow, popups such as the logistic area popup 804 or the assigned resources popup 904 can appear, each displaying the corresponding additional data.

In optional step 1006, the installation process receives user selection based on the additional data presented in optional step 1004. For example, if the logistic area popup 804 currently displays detailed information 810 corresponding to the "Rack/High Rack" area 526b, the user can select the modify button 812 to make changes to various fields for that area. In another example, if the assigned resources popup 904 currently displays resources assigned to the process flow represented by arrow 3b, the user can select the "Add Other Resources" button 922 to add another resource to that process flow. Adding another resource can be achieved, for example, by selecting its corresponding visual representations from various visual representations of other resources not already assigned. In another example, the user can select the "Remove" button 924 to remove assigned resources from the process flow represented by arrow 3b. If the user elects not to update any detailed information, step 1006 may be omitted, and operations can resume in step 1008.

In step 1008, the operations comprise receiving a selection of one of the visual representations by a user. For example, when screen 302 is displayed, if the user selects visual representation 306, representing light storage and operation control, the visual presentation module 112 automatically receives this selection. In another example, when screen 502 is displayed, if the user selects the "Rack/High Rack" visual representation 526, the visual presentation module 112 automatically receives that selection.

In step 1010, the enterprise computing system is configured using at least one of the predefined sets of configuration data that is associated with the selected visual representation. For example, the configuration tool 110 uses the configuration data set 114 corresponding to the visual representation 114 selected in step 1008. If the user selects the "Rack/High Rack" visual representation 526 in step 1008, the associated configuration data set 114 is provided to the configuration tool 110. The operations 1000 may be repeated throughout the guided process 208, and configuration tool 110 then uses the configuration data sets 114 identified to it by the visual presentation module 112 corresponding to each of the visual representations 116 selected by the user. The configuration tool 110 uses these predefined sets of configuration data in configuring the enterprise computing system 102.

Figure 11:
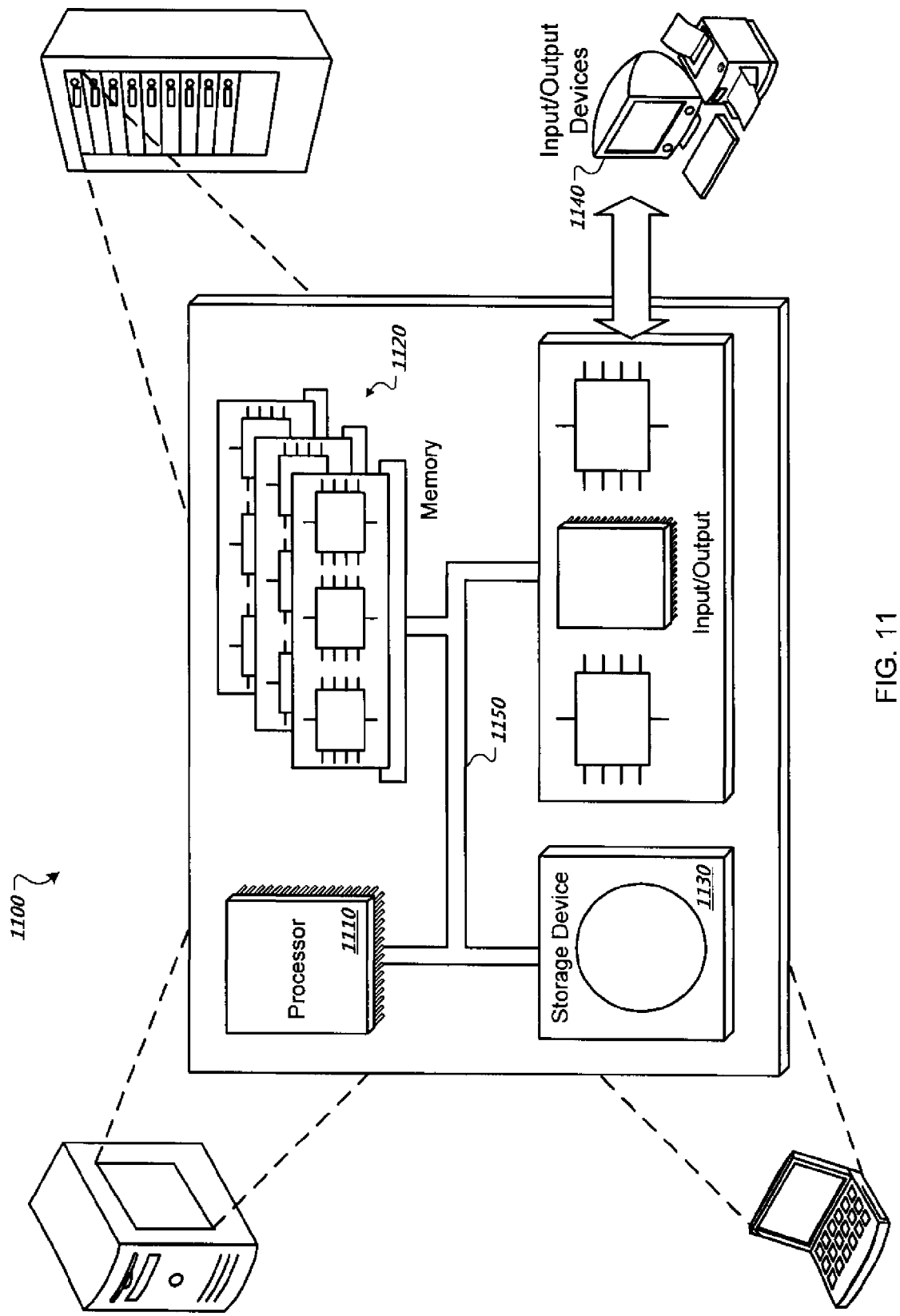
FIG. 11 is a block diagram of a computing system that can be used in connection with computer-implemented methods described in this document.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of configuring an electronic model of a warehouse or production system, which electronic model is used in managing or controlling physical operations of the warehouse or production system by a computing system, the method comprising:

receiving, in a computer system, multiple alternative configuration data sets for a stored electronic model for use in managing or controlling physical operations of a warehouse or production system, each of the alternative configuration data sets including predefined configuration parameters tailored for a respective one of alternative industries to configure the electronic model to manage or control the warehouse or production system for that industry;

presenting identifiers for the multiple alternative configuration data sets in an industry selection view on the display device for user selection;

receiving, in the computer system, the user selection of one of the multiple industries;

presenting, on a display device of the computing system, a first set of multiple different visual representations each corresponding to an alternative aspect of the selected configuration data set, wherein each such visual representation of the first set depicts a different one of multiple different warehouse or production system functions associated with the selected industry;

receiving, at the computing system, a user selection of one of the presented visual representations, and electronically configuring the stored electronic model of the warehouse or production system in computer memory to include the function depicted in the selected representation of the first set;

presenting, on the display device of the computing system, a second set of multiple different visual representations, wherein each such visual representation of the second set depicts both a) the selected warehouse or production system function, and b) a different one of multiple different additional features of the selected warehouse or production system function; and receiving, at the computing system, a user selection of one of the presented second set of visual representations, and electronically configuring the stored electronic model of the warehouse or production system in computer memory to include the additional feature depicted in the selected representation of the second set.

2. The computer-implemented method of claim 1, wherein at least some of the visual representations relate to an extent to which storage and operation control is to be performed in the warehouse or production system.

3. The computer-implemented method of claim 1, wherein at least some of the visual representations relate to whether goods are transported to and from the warehouse or production system.

4. The computer-implemented method of claim 1, wherein at least some of the visual representations relate to a layout of the warehouse or production system.

5. The computer-implemented method of claim 1, wherein at least some of the visual representations relate to a process flow for the warehouse or production system.

6. The computer-implemented method of claim 1, wherein a first one of the visual representations from the first set or the second set includes a control that a user can activate to trigger presentation of a user-selectable portion of associated configuration data.

7. The computer-implemented method of claim 6, wherein the first visual representation depicts a unit, the computing system to govern use of the unit, and wherein the user-selectable portion of the associated configuration data relates to how the unit operates.

8. The computer-implemented method of claim 6, wherein the user-selectable control visually connects at least two units with each other, and wherein the user-selectable portion of the associated configuration data relates to a resource that moves material between the two units.

9. The computer-implemented method of claim 1, wherein configuring the stored electronic model comprises providing, to a configuration tool, configuration data that is associated with the selected visual representations, the configuration tool being configured for performing configuration also without presenting the first and second sets of multiple different visual representations.

10. The computer-implemented method of claim 1, wherein each of the visual representations in the first set is generated to resemble an environment in the warehouse or production system.

11. A computer-readable storage medium comprising instructions that when executed by a processor perform a method of configuring an electronic model of a warehouse or production system, which electronic model is used in managing or controlling physical operations of the warehouse or production system by a computing system, the method comprising:

receiving, in a computer system, multiple alternative configuration data sets for a stored electronic model for use in managing or controlling physical operations of a warehouse or production system, each of the alternative configuration data sets including predefined configuration parameters tailored for a respective one of alternative industries to configure the electronic model to manage or control the warehouse or production system for that industry;

presenting identifiers for the multiple alternative configuration data sets in an industry selection view on the display device for user selection;

receiving, in the computer system, the user selection of one of the multiple industries;

presenting, on a display device of the computing system, a first set of multiple different visual representations each corresponding to an alternative aspect of the selected configuration data set, wherein each such visual representation of the first set depicts a different one of multiple different warehouse or production system functions associated with the selected industry;

receiving, at the computing system, a user selection of one of the presented visual representations, and electronically configuring the stored electronic model of the warehouse or production system in computer memory to include the function depicted in the selected representation of the first set;

presenting, on the display device of the computing system, a second set of multiple different visual representations, wherein each such visual representation of the second set depicts both a) the selected warehouse or production system function, and b) a different one of multiple different additional features of the selected warehouse or production system function; and receiving, at the computing system, a user selection of one of the presented second set of visual representations, and electronically configuring the stored electronic model of the warehouse or production system in computer memory to include the additional feature depicted in the selected representation of the second set.

12. The computer-readable storage medium of claim 11, wherein configuring the stored electronic model comprises providing, to a configuration tool, configuration data that is associated with the selected visual representations, the configuration tool being configured for performing configuration also without presenting the first and second sets of multiple different visual representations.

13. A computer-readable storage medium including instructions that, when executed, generate on a display device a graphical user interface to be generated in connection with configuring an electronic model of a warehouse or production system for use in managing or controlling physical operations of the warehouse or production system by a computing system, the graphical user interface comprising:

a first presentation area presenting identifiers for multiple alternative configuration data sets for a stored electronic model for use in managing or controlling physical operations of a warehouse or production system, each of the alternative configuration data sets including predefined configuration parameters tailored for a respective one of alternative industries to configure the electronic model to manage or control the warehouse or production system for that industry;

a first input control for a user to select one of the multiple industries;

a second presentation area presenting a first set of multiple different visual representations each corresponding to an alternative aspect of the selected configuration data set, wherein each such visual representation of the first set depicts a different one of multiple different warehouse or production system functions associated with the selected industry; and a second input control for a user to select one of the visual representations of the first set, wherein after a selection is received, the stored electronic model of the warehouse or production system in computer memory will be configured to include the function depicted in the selected representation of the first set, and a second set of multiple different visual representations will be presented in the second presentation area, each such visual representation of the second set depicting both a) the selected warehouse or production system function, and b) a different one of multiple different additional features of the selected warehouse or production system function;

wherein a user selection of one of the presented second set of visual representations is received using the graphical user interface, and the stored electronic model of the warehouse or production system in computer memory is electronically configured to include the additional feature depicted in the selected representation of the second set.

14. The computer-readable storage medium of claim 13, wherein a first one of the visual representations from the first set or the second set includes a third input control that a user can activate to trigger presentation of a user-selectable portion of the associated configuration data set.

15. The computer-readable storage medium of claim 14, wherein the first visual representation depicts a unit, the computing system to govern use of the unit, and wherein the user-selectable portion of the associated configuration data set relates to how the unit operates.

16. The computer-readable storage medium of claim 14, wherein the third input control visually connects at least two units with each other, and wherein the user-selectable portion of the associated configuration data set relates to a resource that moves material between the two units.

17. The computer-readable storage medium of claim 13, wherein each of the multiple selectable visual representations is generated to resemble an environment in which the computing system is to be used.

* * * * *